(12) United States Patent
Zhang et al.

(10) Patent No.: US 12,522,092 B2
(45) Date of Patent: Jan. 13, 2026

(54) CHARGING CABLE DEVICE FOR INTELLIGENT NEW ENERGY VEHICLE

(71) Applicant: Anhui Surxin Wire & Cable Co., Ltd., Anhui Province (CN)

(72) Inventors: Jun Zhang, Anhui Province (CN); Wentao Tang, Anhui Province (CN); Xiao Tian, Anhui Province (CN); Lei He, Anhui Province (CN); Mingche Zhu, Anhui Province (CN); Lei Wang, Anhui Province (CN)

(73) Assignee: ANHUI SURXIN WIRE & CABLE CO. LTD., Chizhou (CN)

( * ) Notice: Subject to any disclaimer, the term of this patent is extended or adjusted under 35 U.S.C. 154(b) by 601 days.

(21) Appl. No.: 18/092,514

(22) Filed: Jan. 3, 2023

(65) Prior Publication Data

US 2023/0382247 A1 Nov. 30, 2023

(30) Foreign Application Priority Data

May 30, 2022 (CN) .......................... 202210601662.9

(51) Int. Cl.
*H02J 7/00* (2006.01)
*B60L 53/18* (2019.01)
*B60L 53/31* (2019.01)
*H02J 7/14* (2006.01)

(52) U.S. Cl.
CPC .............. *B60L 53/18* (2019.02); *B60L 53/31* (2019.02)

(58) Field of Classification Search
CPC ................................. B60L 53/18; B60L 53/31
USPC ......................................................... 320/109
See application file for complete search history.

(56) References Cited

U.S. PATENT DOCUMENTS

| | | | | |
|---|---|---|---|---|
| 7,726,998 B2* | 6/2010 | Siebens | .................. | H01R 11/28 439/299 |
| 8,932,072 B2* | 1/2015 | Tamaki | ..................... | B62J 43/16 439/345 |
| 9,088,096 B2* | 7/2015 | Toratani | ............... | H01R 13/639 |
| 9,595,790 B1* | 3/2017 | Cao | .................. | H01R 13/62911 |
| 11,695,233 B2* | 7/2023 | Hsu | ..................... | H01R 13/6275 439/587 |
| 11,745,607 B2* | 9/2023 | Führer | ................. | H01R 13/701 439/352 |
| 12,334,681 B2* | 6/2025 | Kim | ....................... | B60L 53/16 |
| 2014/0170879 A1* | 6/2014 | Kahara | ................... | B60L 50/52 403/321 |
| 2014/0174577 A1* | 6/2014 | Tiberghien | ............. | F16L 37/35 137/798 |
| 2023/0246381 A1* | 8/2023 | Vega | ..................... | B65H 51/10 439/501 |

(Continued)

*Primary Examiner* — Alexis B Pacheco

(57) ABSTRACT

A charging cable device for intelligent new energy vehicle is provided, which includes: a charging cable, a charging cable protection device, an intelligent charging plug, charging cable support devices and a controller; the charging cable is provided in the charging cable protection device, a starting end of the charging cable is connected to a charging pile, and a terminal end of the charging cable is fixedly provided with the intelligent charging plug, multiple charging cable support devices are arranged at a bottom of the charging cable outside the charging cable protection device, all of the charging cable protection device, the intelligent charging plug and the charging cable support devices are electrically connected to the controller.

7 Claims, 3 Drawing Sheets

(56) References Cited

U.S. PATENT DOCUMENTS

| | | | | |
|---|---|---|---|---|
| 2023/0382247 A1* | 11/2023 | Zhang | ................ | B60L 53/16 |
| 2024/0408988 A1* | 12/2024 | Völkl | ................ | B60L 53/16 |
| 2025/0026215 A1* | 1/2025 | Kim | ................ | B60L 53/18 |

* cited by examiner

CHARGING CABLE DEVICE FOR INTELLIGENT NEW ENERGY VEHICLE

CROSS REFERENCE TO RELATED APPLICATION

This patent application claims the benefit and priority of Chinese Patent Application No. 202210601662.9, entitled "Charging Cable Device for Intelligent New Energy Vehicle" filed on May 30, 2022, the disclosure of which is incorporated by reference herein in its entirety as part of the present application.

TECHNICAL FIELD

The present disclosure relates to a technical field of vehicle charging, in particular to a charging cable device for intelligent new energy vehicles.

BACKGROUND ART

Electric vehicles have gradually entered the social market with the advantages of energy conservation and environmental protection, which is strongly supported by the state, and thus major domestic and foreign vehicle manufacturers also have increased the research and development and production of electric vehicle. The electric vehicle is mainly powered by electricity. Similar to a fuel filler of a gasoline vehicle, an electric vehicle also has a charging interface through which the electric vehicle is charged via a charging cable. The existing electric vehicle needs long charging time, and during a charging process, if a vehicle owner is not waiting nearby, the charging cable may be stolen or pulled out by others, which makes charging difficult to complete and possibly delays the vehicle owner's trip. In addition, in order to meet requirements in different situations, the existing charging pile is often provided with a very long charging cable. When the vehicle is being charged, the vehicle owner may yank the charging cable for saving time, which causes damage to the charging cable and then leads to potential safety hazards. Furthermore, the charging cable is generally scattered on the ground, which makes it very easy to be crushed or soiled and then be damaged. Therefore, it is very necessary to design a charging cable device for an intelligent new energy vehicle.

SUMMARY

The present disclosure intends to provide a charging cable device for an intelligent new energy vehicle, which can prevent the charging cable from being maliciously pulled out, resulting in an interruption of charging, and can reduce the damage to the charging cable, thereby improving a service life and safety of the charging cable.

In order to achieve the above effect, the present disclosure provides the following solutions:

A charging cable device for the intelligent new energy vehicles, includes: a charging cable, a charging cable protection device, an intelligent charging plug, charging cable support devices and a controller; the charging cable is provided in the charging cable protection device, a starting end of the charging cable is connected to a charging pile, and a terminal end of the charging cable is fixedly provided with the intelligent charging plug, multiple charging cable support devices are arranged at a bottom of the charging cable outside the charging cable protection device, and all of the charging cable protection device, the intelligent charging plug and the charging cable support devices are electrically connected to the controller;

the charging cable protection device includes a protective housing, a spool, a rotating motor, a first gear, a second gear, a rotating component and a damping module, where the rotating component is provided on a left in the protective housing, and the rotating motor is provided on a right in the protective housing; the spool is rotatably arranged between the rotating component and the rotating motor, and the charging cable is wound around the spool, the first gear is fixedly arranged on the spool, the second gear is rotatably arranged on a top of the protective housing, the first gear is engaged with the second gear, the second gear is coaxially fixed with a rotating wheel, and a steel rope is wound around the rotating wheel; and the steel rope is connected to the damping module, and the rotating motor is electrically connected to the controller;

the intelligent charging plug includes a plug body and an anti-unplugging mechanism, where the anti-unplugging mechanism is provided in the plug body; the anti-unplugging mechanism includes a connecting rod, a stopper component, an anti-unplugging insert hook, a button and a stopper; the button is provided on the plug body, the connecting rod is provided inside the plug body, one end of the connecting rod is fixedly connected to the button, and an other end of the connecting rod is connected, through a connecting rod shaft, to the anti-unplugging insert hook which is configured to match with an anti-unplugging jack provided at a vehicle charging socket; and the stopper component is provided at a bottom of a corner of the connecting rod, the stopper is provided at a bottom of the stopper component, and the stopper is electrically connected to the controller;

each charging cable support device includes a fixing plate, a first electric extension rod and a clamping component, where the first electric extension rod is fixedly provided at a top of the fixing plate, and a universal wheel and a brake pad are provided at a bottom of the fixing plate, the clamping component is provided at a top output end of the first electric extension rod, the charging cable is arranged in the clamping component, and the first electric extension rod is electrically connected to the controller.

In an embodiment, the damping module includes a first cavity, a second cavity, a piston rod and a piston, where the first cavity is provided inside the protective housing, the second cavity is fixedly arranged on a right of the first cavity, the steel rope is connected to the piston rod, the piston rod is slidably connected inside the first cavity, a disc is coaxially connected to the piston rod, a terminal end of the piston rod is fixedly connected to the piston, the piston is slidably connected inside the second cavity, an inside of the first cavity is provided with hydraulic oil, and the disc is provided with multiple damping holes.

In an embodiment, a spring is arranged between a bottom of the piston and the second cavity.

In an embodiment, the stopper includes a first housing, a second housing, a second electric extension rod and a sliding block, where sliding cavities are provided in centers of sides of the first housing and the second housing respectively, the second electric extension rod is fixedly provided on a left inside the sliding cavity of the first housing, an output end of the second electric extension rod is fixedly connected to the sliding block, the stopper component is arranged between the first housing and the second housing, and the second electric extension rod is electrically connected to the controller.

In an embodiment, the clamping component includes a clamping base and a clamping upper cover, where the clamping base is fixedly arranged on a top of the first electric extension rod, the clamping upper cover is hinged with a left end of the clamping base, and the clamping upper cover is detachably connected with a right end of the clamping base.

In an embodiment, rubber pads are provided inside the clamping base and the clamping upper cover to protect the charging cable.

In an embodiment, a pair of cleaning rollers is provided at a charging cable outlet on the protective housing for cleaning an outer surface of the charging cable.

According to specific embodiments provided by the present disclosure, the technical effects of the present disclosure are as follows: the present disclosure provides a charging cable device for an intelligent new energy vehicle, which is provided with a charging cable protection device including a protective housing, a spool, a rotating motor, a first gear, a second gear, a rotating component and a damping module. When the vehicle is being charged, the charging cable is pulled out through a charging cable outlet of the protective housing to make it reach a suitable length. Additionally, the charging cable protection device is provided with a damping module, and then with a principle of damping, the damage to the charging cable caused by yanking the charging cable of the vehicle owner can be prevented, so as to ensure that the charging cable is pulled out smoothly and orderly. After use, the spool is driven by the rotating motor to rotate in an opposite direction to a direction of pulling, so that the excess charging cable is wound on the spool to realize the recovery of the charging cable. The device is also provided with an intelligent charging plug including a plug body and an anti-unplugging mechanism. In a process of use, the controller controls the retraction of the second electric extension rod, so that the sliding block retracts into the inside of the first housing, and then the button is pressed to make the stopper component enter between the first housing and the second housing, and at this time, the connecting rod moves down, and the anti-unplugging insert hook is driven to moves up by the connecting rod shaft, so that it can be pulled or plugged. During charging, the controller controls the extension of the second electric extension rod to drive the sliding block to be fixed between the first housing and the second housing. At this time, when the button is pressed, the stopper component cannot move down, and then it cannot drive the anti-unplugging insert hook to moves up. At this time, the anti-unplugging insert hook is positioned at the corresponding vehicle charging socket, so that the charging cable cannot be pulled or plugged. The device is also provided with multiple charging cable support devices, by means of which the charging cable can be suspended in the air to prevent from being damaged and crushed. Each charging cable support device includes a fixing plate, a first electric extension rod and a clamping component, where the charging cable is fixed by the clamping component, and the first electric extension rod drives the charging cable to be raised or lowered to an appropriate position as required.

BRIEF DESCRIPTION OF THE DRAWINGS

In order to more clearly illustrate embodiments of the present disclosure or technical solutions in the conventional technology, accompanying drawings used in the embodiments will now be described briefly. It is obvious that the drawings in the following description are only some embodiments of the present disclosure, and that those skilled in the art can obtain other drawings from these drawings without any inventive effort.

REFERENCE NUMERALS

1—controller; 2—intelligent charging plug; 3—charging cable protection device; 4—charging cable support device; 5—protective housing; 6—spool; 7—rotating motor; 8—rotating component; 9—first gear; 10—second gear; 11—rotating wheel; 12—steel rope; 13—piston rod; 14—disc; 15—damping hole; 16—first cavity; 17—second cavity; 18—spring; 19—cleaning roller; 20—clamping upper cover; 21—clamping base; 22—first electric extension rod; 23—fixing plate; 24, universal wheel; 25—rubber pad; 26—plug body; 27—button; 28—connecting rod; 29—connecting rod shaft; 30—anti-unplugging insert hook; 31—stopper; 32—stopper component; 33—LED light; 34—first housing; 35—second housing; 36—second electric extension rod; 37—sliding block; 38—piston; 39—charging cable.

DETAILED DESCRIPTION OF THE EMBODIMENTS

In the following, technical solutions in the embodiments of the present disclosure will be clearly and completely described with reference to the drawings in the embodiments of the present disclosure. Obviously, the described embodiments are only a part of the embodiments of the present disclosure, but not all the embodiments. Based on the embodiments of the present disclosure, all other embodiments obtained by a person of ordinary skill in the art without any inventive effort are within the scope of the present disclosure.

The present disclosure intends to provide a charging cable device for an intelligent new energy vehicle, which can prevent the charging cable from being maliciously pulled out, resulting in an interruption of charging, and can reduce the damage to the charging cable, thereby improving a service life and safety of the charging cable.

To further clarify the above objects, features and advantages of the present disclosure, a more particular description of the disclosure will be rendered by reference to the accompanying drawings and specific embodiments thereof.

Figure 1:
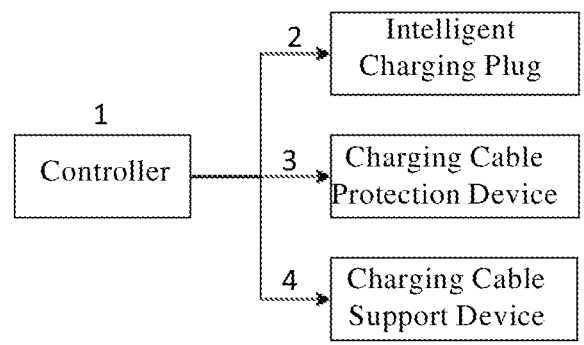
FIG. 1 is a schematic structural diagram of a charging cable device for an intelligent new energy vehicle according to an embodiment of the present disclosure.

As shown in FIG. 1, a charging cable device for an intelligent new energy vehicle provided by an embodiment of the present disclosure includes: a charging cable 39, a charging cable protection device 3, an intelligent charging plug 2, charging cable support devices 4 and a controller 1; where, the charging cable 39 is provided in the charging cable protection device 3, a starting end of the charging cable 39 is connected to a charging pile, and a terminal end of the charging cable 39 is fixedly provided with the intelligent charging plug 2, multiple charging cable support devices 4 are arranged at a bottom of the charging cable 39 outside the charging cable protection device 3, and all of the charging cable protection device 3, the intelligent charging plug 2 and the charging cable support devices 4 are electrically connected to the controller 1.

Figure 2:
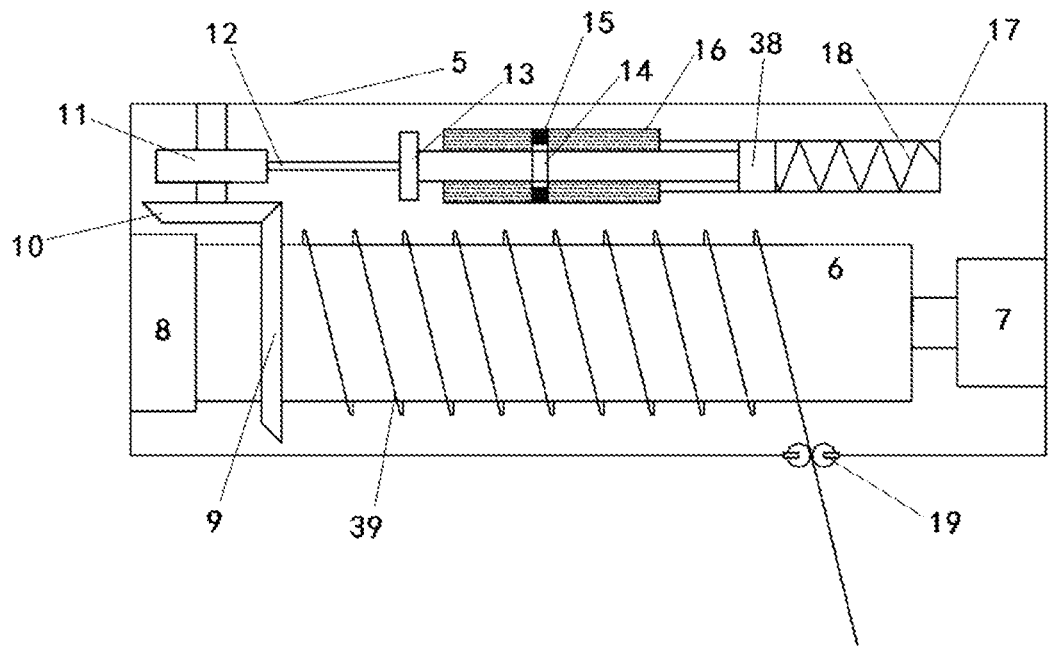
FIG. 2 is a schematic structural diagram of a charging cable protection device.

As shown in FIG. 2, the charging cable protection device 3 includes a protective housing 5, a spool 6, a rotating motor 7, a first gear 9, a second gear 10, a rotating component 8 and a damping module; the rotating component 8 is provided on the left in the protective housing 5, and the rotating motor 7 is provided on the right in the protective housing 5; the spool 6 is rotatably arranged between the rotating component 8 and the rotating motor 7, and the charging cable 39 is wound around the spool 6, the first gear 9 is fixedly arranged on the spool 6, the second gear 10 is rotatably arranged on a top of the protective housing 5, the first gear 9 is engaged with the second gear 10, the second gear 10 is coaxially fixed with a rotating wheel 11, and a steel rope 12 is wound around the rotating wheel 11; the steel rope 12 is connected to the damping module, and the rotating motor 7 is electrically connected to the controller 1.

Figure 3:
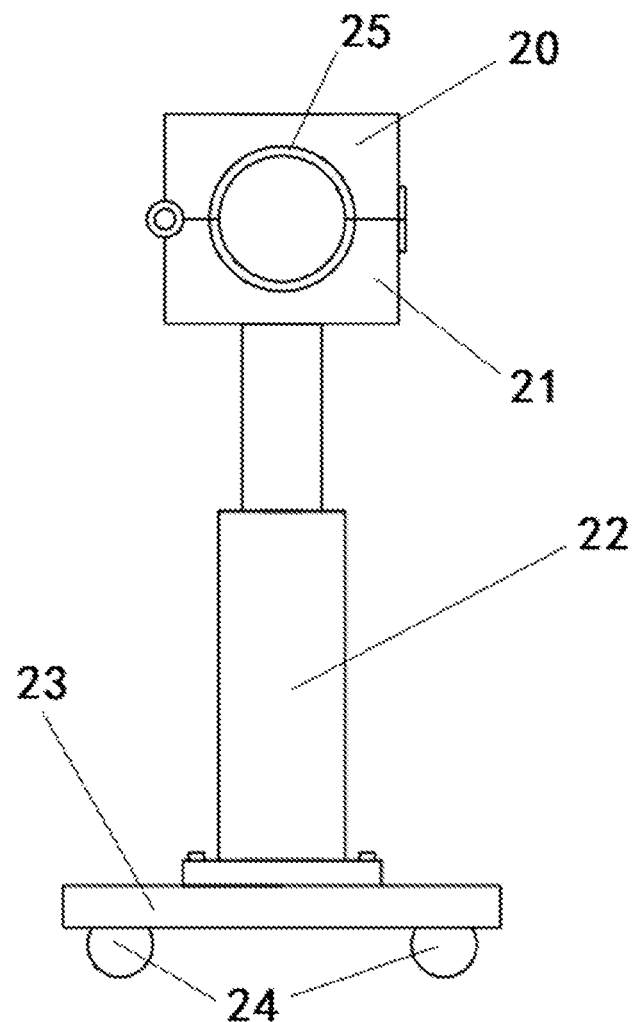
FIG. 3 is a schematic structural diagram of a charging cable support device.

As shown in FIG. 3, the intelligent charging plug includes a plug body 26 and an anti-unplugging mechanism, the anti-unplugging mechanism is provided in the plug body 26; the anti-unplugging mechanism includes a connecting rod 28, a stopper component 31, an anti-unplugging insert hook 30, a button 27 and a stopper 32; the button 27 is provided on the plug body 26, the connecting rod 28 is provided inside the plug body 26, one end of the connecting rod 28 is fixedly connected to the button 27, and the other end of the connecting rod 28 is connected, through a connecting rod shaft 29, to the anti-unplugging insert hook 30 which is configured to match with an anti-unplugging jack provided at a vehicle charging socket; the stopper component 31 is provided at a bottom of a corner of the connecting rod 28, the stopper 32 is provided at a bottom of the stopper component 31, and the stopper 32 is electrically connected to the controller 1.

Figure 4:
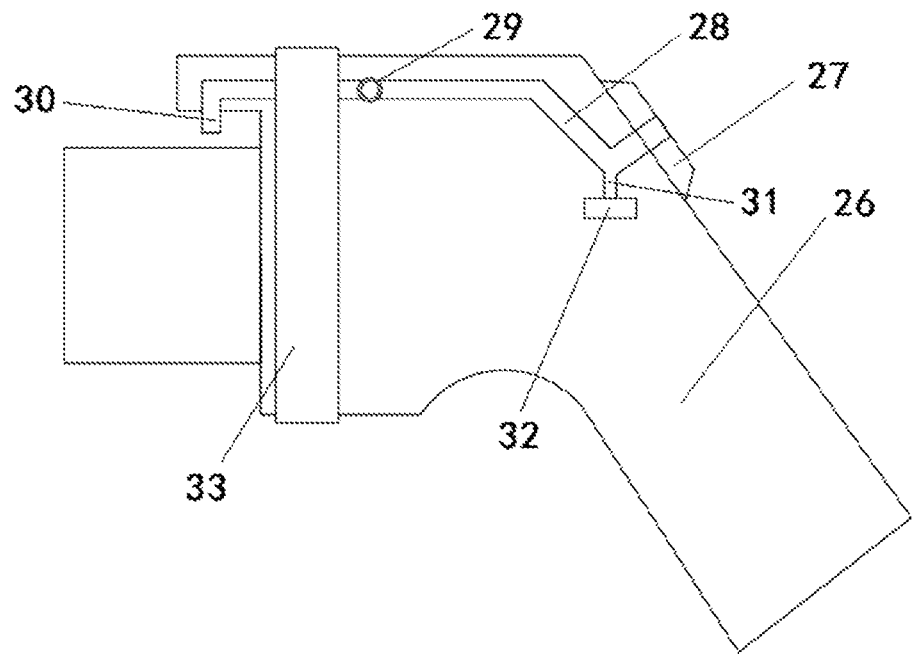
FIG. 4 is a schematic structural diagram of an intelligent charging plug.

As shown in FIG. 4, the charging cable support device includes a fixing plate 23, a first electric extension rod 22 and a clamping component, the first electric extension rod 22 is fixedly provided at a top of the fixing plate 23, and a universal wheel 24 and a brake pad are provided at a bottom of the fixing plate 23, the clamping component is provided at a top output end of the first electric extension rod 22, the charging cable 39 is arranged in the clamping component, and the first electric extension rod 22 is electrically connected to the controller 1.

The damping module includes a first cavity 16, a second cavity 17, a piston rod 13 and a piston 38; the first cavity 16 is provided inside the protective housing 5, the second cavity 17 is fixedly arranged on a right of the first cavity 16, the steel rope 12 is connected to the piston rod 13, the piston rod 13 is slidably connected inside the first cavity 16, a disc 14 is coaxially connected to the piston rod 13, a terminal end of the piston rod 13 is fixedly connected to the piston 38, the piston 38 is slidably connected inside the second cavity 17, an inside of the first cavity 16 is provided with hydraulic oil, and the disc 14 is provided with multiple damping holes.

A spring 18 is arranged between a bottom of the piston 38 and the second cavity 17.

A use process of the charging cable protection device is as follows: when charging is required, the charging cable is pulled outward through the charging cable outlet on the protective housing, and at this time, the spool starts to rotate, thereby driving the first gear to rotate, the first gear driving the second gear to rotate and then driving the rotating wheel to rotate, which in turn drives the steel rope to wind around the rotating wheel and pulls the piston rod to move to the left. The first cavity is provided with the hydraulic oil, and the disc is provided with multiple damping holes, and thus during the movement of the piston rod to the left, the hydraulic oil flows left and right in the first cavity through the damping holes on the disc, which plays a damping role on the spool and can ensure that the charging cable is pulled out smoothly and orderly. During this process, the piston also moves to the left along the second cavity, and then stretches the spring, which also can work to some extent. When the charging is completed, the controller controls the rotating motor to drive the spool to rotate in an opposite direction to the direction in which the spool rotates when the charging cable is pulled, so that the external charging cable is re-wound around the spool. At this time, the spool drives the first gear to rotate, which in turn drives the second gear and the rotating wheel to rotate, and then drives the steel rope to stretch. At this time, under an action of the spring, the piston and piston rod return to their original positions. When the charging cable is pulled out and pulled back, the cleaning rollers at the charging cable outlet on the protective housing clean the charging cable to prevent damage to the charging cable.

Figure 5:
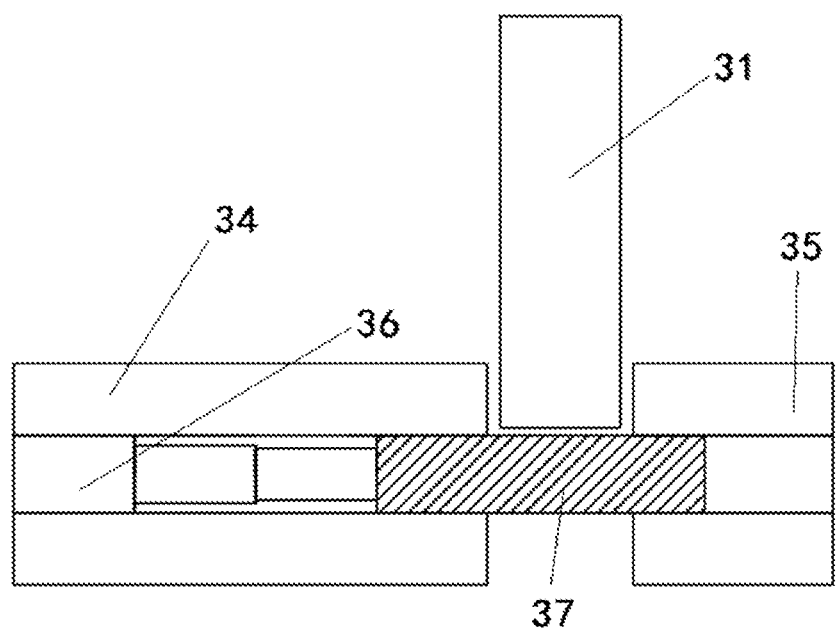
FIG. 5 is a schematic structural diagram of a stopper.

As shown in FIG. 5, the stopper 32 includes a first housing 34, a second housing 35, a second electric extension rod 36 and a sliding block 37; sliding cavities are provided in centers of sides of the first housing 34 and the second housing 35 respectively, the second electric extension rod 36 is fixedly provided on the left inside the sliding cavity of the first housing 34, an output end of the second electric extension rod 36 is fixedly connected to the sliding block 37, the stopper component 31 is arranged between the first housing 34 and the second housing 35, and the second electric extension rod 36 is electrically connected to the controller 1.

An outside of the plug body is provided with an LED light for lighting at night, which is convenient for pulling and plugging and charging, and the LED light is electrically connected to the controller.

A use process of the intelligent charging plug is as follows: when it needs to be pulled or plugged, the controller controls the second electric extension rod to retract, and then drives the sliding block to retract into the first housing. At this time, the button is pressed, the stopper component moves down and drives the connecting rod to move down, the connecting rod drives the anti-unplugging insert hook to move up through the connecting rod shaft, and at this time, the plug body can be plugged into the vehicle charging socket. When charging, the controller controls the second electric extension rod to extend to drive the sliding block to extend between the first housing and the second housing. At this time, when the button is pressed, the stopper component is blocked by the sliding block and cannot move down, and then the anti-unplugging insert hook is positioned in the anti-unplugging jack at the vehicle charging socket, which can effectively restrict the charging cable from being maliciously pulled out and plugged into.

The clamping component includes a clamping base 21 and a clamping upper cover 20; the clamping base 21 is fixedly arranged on a top of the first electric extension rod 22, the clamping upper cover 20 is hinged with a left end of the clamping base 21, and the clamping upper cover 20 is detachably connected with a right end of the clamping base 21.

Rubber pads 25 are provided inside the clamping base 21 and the clamping upper cover 20 to protect the charging cable 39.

A use process of the charging cable support devices is as follows: the device is moved to a designated position through the universal wheel and fixed by the brake pad; how many charging cable support devices are used can be determined according to the distance among the charging pile and the charging cable protection device and the vehicle; and the clamping component is opened and the charging cable is put in. At this time, the controller controls the first electric extension rod to extend to the designated position to raise it, thereby preventing damage caused by being crushed.

A pair of cleaning rollers 19 is provided at a charging cable outlet on the protective housing 5 for cleaning an outer surface of the charging cable 39.

The controller 1 may be implemented as a microprocessor or a single-chip microcomputer, etc., and the device can also be provided with a wireless communication module. The controller communicates with a host computer of a charging station through the wireless communication module. A quick response code can be provided on the charging pile, and the host computer of the charging station can be connected through scanning the quick response code by a mobile phone, and then the required operations are sent to the host computer of the charging station. The host computer of the charging station controls the controller via the wireless communication module to execute the operations. Other methods that can realize this function in the prior art can also be used.

The present disclosure provides a charging cable device for an intelligent new energy vehicle, which is provided with a charging cable protection device including a protective housing, a spool, a rotating motor, a first gear, a second gear, a rotating component and a damping module. When the vehicle is being charged, the charging cable is pulled out through a charging cable outlet of the protective housing to make it reach a suitable length. Additionally, the charging cable protection device is provided with a damping module, and then with a principle of damping, the damage to the charging cable caused by yanking the charging cable of the vehicle owner can be prevented, so as to ensure that the charging cable is pulled out smoothly and orderly. After use, the spool is driven by the rotating motor to rotate in an opposite direction to a direction of pulling, so that the excess charging cable is wound on the spool to realize the recovery of the charging cable. The device is also provided with an intelligent charging plug including a plug body and an anti-unplugging mechanism. In the process of use, the controller controls the retraction of the second electric extension rod, so that the sliding block retracts into the inside of the first housing, then the button is pressed to make the stopper component enter between the first housing and the second housing, and at this time, the connecting rod moves down, and the anti-unplugging insert hook is driven to moves up by the connecting rod shaft, so that it can be pulled or plugged. During charging, the controller controls the extension of the second electric extension rod to drive the sliding block to be fixed between the first housing and the second housing. At this time, when the button is pressed, the stopper component cannot move down, and then it cannot drive the anti-unplugging insert hook to moves up. At this time, the anti-unplugging insert hook is positioned at the corresponding vehicle charging socket, so that the charging cable cannot be pulled or plugged. The device is also provided with multiple charging cable support devices, by means of which the charging cable can be suspended in the air to prevent from being damaged and crushed. Each charging cable support device includes a fixing plate, a first electric extension rod and a clamping component, where the charging cable is fixed by the clamping component, and the first electric extension rod drives the charging cable to be raised or lowered to an appropriate position as required.

The principles and implementation of the present disclosure have been described herein with specific examples, and the above embodiments are presented to aid in the understanding of the methods and core concepts of the present disclosure; meanwhile, those skilled in the art may make some changes in both the detailed description and an application scope according to the teachings of this disclosure. In conclusion, the contents of the description should not be construed as limiting the disclosure.

What is claimed is:

1. A charging cable device for an intelligent new energy vehicle, comprising:
    a charging cable,
    a charging cable protection device,
    an intelligent charging plug,
    a plurality of charging cable support devices, and
    a controller;
    wherein
        the charging cable is provided in the charging cable protection device, a starting end of the charging cable is connected to a charging pile, and a terminal end of the charging cable is fixedly provided with the intelligent charging plug, the plurality of the charging cable support devices are arranged at a bottom of the charging cable outside the charging cable protection device, and all of the charging cable protection device, the intelligent charging plug and the charging cable support devices are electrically connected to the controller;
        the charging cable protection device comprises a protective housing, a spool, a rotating motor, a first gear, a second gear, a rotating component and a damping module, wherein the rotating component is provided on a left in the protective housing, and the rotating motor is provided on a right in the protective housing; the spool is rotatably arranged between the rotating component and the rotating motor, the charging cable is wound around the spool, the first gear is fixedly arranged on the spool, the second gear is rotatably arranged on a top of the protective housing, the first gear is engaged with the second gear, the second gear is coaxially fixed with a rotating wheel, and a steel rope is wound around the rotating wheel; and the steel rope is connected to the damping module, and the rotating motor is electrically connected to the controller;
        the intelligent charging plug comprises a plug body and an anti-unplugging mechanism, wherein the anti-unplugging mechanism is provided in the plug body; the anti-unplugging mechanism comprises a connecting rod, a stopper component, an anti-unplugging insert hook, a button and a stopper; the button is provided on the plug body, the connecting rod is provided inside the plug body, one end of the connecting rod is fixedly connected to the button, and an other end of the connecting rod is connected, through a connecting rod shaft, to the anti-unplugging insert hook which is configured to match with an anti-unplugging jack provided at a vehicle charging socket; and the stopper component is provided at a bottom of a corner of the connecting rod, the stopper is provided at a bottom of the stopper component, and the stopper is electrically connected to the controller;

each charging cable support device comprises a fixing plate, a first electric extension rod and a clamping component, wherein the first electric extension rod is fixedly provided at a top of the fixing plate, and a universal wheel and a brake pad are provided at a bottom of the fixing plate, the clamping component is provided at a top output end of the first electric extension rod, the charging cable is arranged in the clamping component, and the first electric extension rod is electrically connected to the controller.

2. The charging cable device for the intelligent new energy vehicle according to claim 1, wherein the damping module comprises a first cavity, a second cavity, a piston rod and a piston, wherein the first cavity is provided inside the protective housing, the second cavity is fixedly arranged on a right of the first cavity, the steel rope is connected to the piston rod, the piston rod is slidably connected inside the first cavity, a disc is coaxially connected to the piston rod, a terminal end of the piston rod is fixedly connected to the piston, the piston is slidably connected inside the second cavity, an inside of the first cavity is provided with hydraulic oil, and the disc is provided with a plurality of damping holes.

3. The charging cable device for the intelligent new energy vehicle according to claim 2, wherein a spring is arranged between a bottom of the piston and the second cavity.

4. The charging cable device for the intelligent new energy vehicle according to claim 1, wherein the stopper comprises a first housing, a second housing, a second electric extension rod and a sliding block, wherein sliding cavities are provided in centers of sides of the first housing and the second housing respectively, the second electric extension rod is fixedly provided on a left inside the sliding cavity of the first housing, an output end of the second electric extension rod is fixedly connected to the sliding block, the stopper component is arranged between the first housing and the second housing, and the second electric extension rod is electrically connected to the controller.

5. The charging cable device for the intelligent new energy vehicle according to claim 1, wherein the clamping component comprises a clamping base and a clamping upper cover, wherein the clamping base is fixedly arranged on a top of the first electric extension rod, the clamping upper cover is hinged with a left end of the clamping base, and the clamping upper cover is detachably connected with a right end of the clamping base.

6. The charging cable device for the intelligent new energy vehicle according to claim 5, wherein rubber pads are provided inside the clamping base and the clamping upper cover to protect the charging cable.

7. The charging cable device for the intelligent new energy vehicle according to claim 1, wherein a pair of cleaning rollers are provided at a charging cable outlet on the protective housing for cleaning an outer surface of the charging cable.

* * * * *